May 3, 1938.  J. B. MILES, JR  2,116,318

ELECTRICAL EQUIPMENT

Filed July 31, 1935

John B. Miles, Jr. INVENTOR.

BY Frank C. Hilberg

ATTORNEY.

Patented May 3, 1938

2,116,318

UNITED STATES PATENT OFFICE 2,116,318

ELECTRICAL EQUIPMENT

John B. Miles, Jr., Wilmington, Del., assignor to E. I. du Pont de Nemours & Company, Wilmington, Del., a corporation of Delaware Application July 31, 1935, Serial No. 33,930

5 Claims. (Cl. 171—206)

This invention relates to the insulation of electrical equipment and more particularly to an improved type of generator motor and the like in which the windings thereof are impregnated with or embedded in a matrix of a resin having a high dielectric strength.

This case is a continuation in part of my application Serial No. 670,754, filed May 12, 1933.

Heretofore, coils for use in motors, generators, transformers and other electrical equipment have been wound with an enameled, silk, or cotton covered wire. In order to prevent the absorption of moisture by the cotton or silk and consequent impairment of its efficiency as an insulator, and in order to form a compact, mechanically strong unit of the coil and also to prevent deterioration and the accumulation of dust, dirt and sometimes metal particles in the interstices of the windings, the coil is usually impregnated by dipping or other means with a varnish, consisting of a natural or synthetic gum in solution and is then baked to remove the solvent. The evaporation of the solvent results in the formation of pin holes which allow the entrance of moisture, result in poor mechanical strength of the finished coil and impair the insulation properties of the material between the wires.

An object of the present invention is the provision of a motor or generator the windings of which are resistant to water, oil, dirt and the like.

A further object is the provision of a motor or generator in which the interstices of the windings are filled with a composition of light weight having a high dielectric and mechanical strength. A still further object is a method of preparing motors and generators in which the usual baking treatment is eliminated. Other objects will appear hereinafter.

These objects are accomplished by the following invention by applying to the windings to be treated a liquid capable of polymerizing to a resin, and more particularly by applying a mixture of monomeric and polymeric methyl methacrylates, and allowing the same to polymerize completely in situ.

Figure 1:
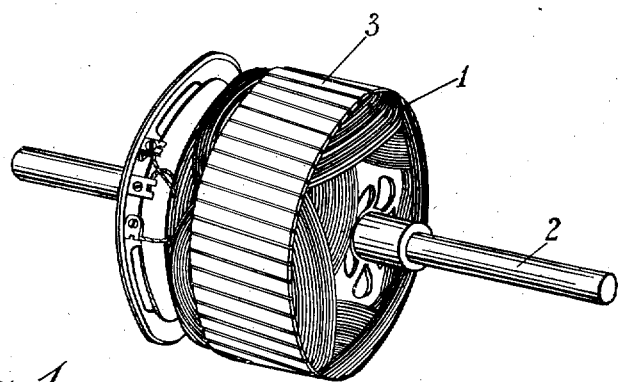
Figure 4:
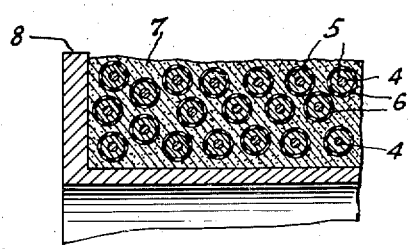
Figure 2:
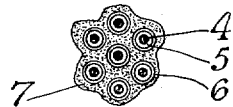
Figure 3:
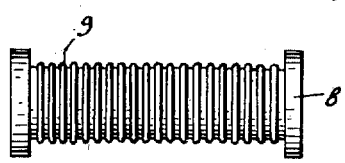

In the drawing, Fig. 1 is a perspective view of a wound rotor of an induction motor. Fig. 2 is a detailed section through a few of the windings of the rotor in Fig. 1. Fig. 3 is a plan view of a coil having one row of windings ready to receive an application of the varnish described below. Fig. 4 is an enlarged diagrammatic section of a coil such as shown in Figure 3 which has been wound and to which the varnish has been applied. In Fig. 1, the windings are indicated as 1, and the shaft as 2, the iron laminations about which the windings are wound are indicated as 3. In Fig. 2 the copper of the wire is indicated as 4, and an enamel coating as 5, and a cotton insulation as 6. This wire winding is embedded in a matrix of resin shown as 7.

In Figure 3, 8 represents a form which may be temporary or permanent upon which windings 9 are wound. The winding 9 may be any conductor, but is preferably one having the construction shown in detail in Figure 4 in which 4 is the conductor, 5 is an enamel coating, and 6 is cotton insulation.

Methyl methacrylate monomer may be prepared by treating methyl alpha-hydroxy-isobutyrate with a dehydrating agent such as phosphorous pentoxide. The compound produced in the monomeric form is a comparatively thin colorless liquid. This may be transformed into the polymeric form by heat or radiant energy with or without a catalyst and a satisfactory method consists of adding 0.5% by weight of benzoyl peroxide to the monomer and heating the mixture at 100° C. for 4 hours.

Example 1

In a solution of 10 parts of methyl methacrylate polymer in 90 parts of methyl methacrylate monomer is dissolved about 0.01% by weight of benzoyl peroxide. This solution is then applied by dipping to the windings of a motor and the impregnated windings, then baked in an oven at 60° C. until polymerization of the methyl methacrylate monomer is substantially complete.

Example 2

In a solution of fifteen parts of methyl methacrylate polymer in 85 parts of methyl methacrylate monomer are dissolved 0.5% of benzoyl peroxide, and this solution is then applied by dipping to the windings of a generator. The impregnated windings are then allowed to stand in a closed container until the impregnant sets up. Subsequent impregnations are then applied until thorough impregnation is obtained.

Example 3

To a solution of 5 parts of methyl methacrylate polymer in 95 parts of methyl methacrylate monomer is added 0.1% by weight of benzoyl peroxide and the mixture stirred until solution of the benzoyl peroxide is complete. This solution is then applied to the windings of a motor in the same manner as indicated in Example 1 or 2.

*Example 4*

To 90 parts of methyl methacrylate monomer are added 10 parts of methyl methacrylate polymer, and the mixture stirred at substantially room temperature until solution is complete. The windings of a generator are treated with this solution in the same manner as in Example 1, except that the baking temperature is 80° C.

*Example 5*

In about 1000 parts of methyl methacrylate monomer is dissolved 0.1 part by weight of benzoyl peroxide, and the mixture heated at 80° C. until a syrup approximating a viscosity of 10 poises is obtained. The syrup is then cooled to retard polymerization and the syrup applied to an electrical coil which is then heated at 60° C. to effect further polymerization.

*Example 6*

Methyl methacrylate monomer is applied to the windings of a transformer which are then heated at 60° C. in a closed container to effect polymerization of the monomer. In order to prevent the evaporation of the monomer before it hardens, I generally prefer to heat the impregnated coil in a closed container. The same result may be obtained by increasing the vapor pressure of the monomer in the container; e. g., by having in the container an open surface of monomer, the polymerization of which has been inhibited as, for example, by the addition of hydroquinone or pyrogallol.

The liquid may be applied to the windings by means of dipping, spraying, brushing, or other methods known to those skilled in the art.

While I have illustrated the preferred method by the use of benzoyl peroxide as the catalyst, I may eliminate this and resort to heat alone or to some form of radiant energy to effect polymerization either in the preparation of the syrup or to carry it to completion in the impregnated coil.

It will be apparent that the viscosity of the polymer may be varied within rather wide limits. Consequently, a syrup of a given viscosity may be prepared by mixing more monomer and less high viscosity polymer or by mixing less monomer with more low viscosity polymer. Such modifications will be apparent to those skilled in the art.

While I generally prefer to use the methyl ester of methacrylic acid, under some conditions I may use esters of methacrylic acid prepared from alcohols other than methyl. These may me aliphatic; e. g., ethyl, propyl, etc., or carbocylic; e. g., cyclohexyl, bornyl, furfuryl, etc. The esters of methacrylic acid derivable from the mixture of alcohols obtained along with methanol by the catalytic hydrogenation of oxides of carbon may also be used.

Where mixtures of monomer and polymer are used, the proportions of each may be varied within wide limits. Generally, however, the proportions are governed by the properties desired in the syrup. The admixing of polymer and monomer may be carried out simply by stirring the polymer in the monomer, and allowing the mixture to stand at substantially room temperature so that the monomer may swell up the polymer and dissolve it. In some cases, however, mechanical mixing may be used as by working the polymer in an internal type mixer, e. g., "Banbury" mill, and adding thereto slowly the monomer.

The invention is not limited to the impregnation of coils made from fabric coated insulation, but may be used to impregnate coils made from enameled wire. A very useful modification consists in coating an enameled wire with braided fabric which itself is impregnated with methyl methacrylate.

While I have disclosed the use of a mixture of polymerized and un-polymerized methyl methacrylate, I may use a solution of the polymer, although this is not the preferred method since many advantages accrue from the fact that no solvent is necessary.

The method herein disclosed presents many advantages. As indicated above, no solvent is necessary and consequently its elimination which usually requires baking and solvent recovery apparatus is obviated. Another advantage attributable to the absence of solvent is that shrinkage and pin holes are either eliminated or at least reduced to a minimum.

Another advantage resides in the fact that the long baking period at high temperatures required when prior art varnishes are used is not necessary. This results in a decided saving not only in time, but in expensive equipment such as ovens and fuel.

The method herein disclosed is likewise applicable to the insulation of the segments of a commutator. In this application I prefer to use fillers which may be organic such as wood flour, paper, fibers, or inorganic such as mica flake, asbestos, etc.

The generators and motors herein described are particularly adapted for use in automobiles, boats, and airplanes as well as stationary installations where water, spray, rain, and the like are apt to come in contact with the generator or motor. The invention is not confined to the treatment of generators and motors, but is applicable to high and low tension magnetic coils, solenoids, reactance coils and coils of vibrating chargers, buzzers, magnetos, and other electrical devices.

In the examples above, I have recited the use of pure methyl methacrylate. It is to be understood that I may modify this material by incorporating therewith fillers, plasticizers, or any material which will alter the physical properties thereof either as disclosed in my original application or as will be apparent to those skilled in the art.

Other advantages will be apparent, for example, a quiet motor for fans and the like may be made by filling the voids of the stator and rotor, thereby reducing windage and vibration.

Motors prepared according to the invention herein disclosed have an exceptionally long life. This is of particular advantage where they are to be used in an inaccessible place as in "sealed-in" installations such as refrigerators, oil burners, and the like. It is also applicable to motors which must run continually such as in airplanes, moving picture projectors, recording devices, and other such places where a breakdown would result in considerable loss or inconvenience.

It is apparent that many widely different embodiments of this invention may be made without departing from the spirit and scope thereof; and, therefore, it is not intended to be limited except as indicated in the appended claims.

I claim:

1. In the process of preparing electrical coils, the step of applying a mixture of a monomeric and polymeric methacrylate esters to said coils.

2. Process of preparing a coil of an electrical device which comprises winding a plurality of turns of insulated wire into a coil and applying thereto a mixture of monomeric and polymeric methyl methacrylates so that the interstices of the windings are filled with the said methyl methacrylate, and heating to 60° C. until the mixture solidifies.

3. An insulating varnish comprising a syrupy mixture of monomeric and polymeric methyl methacrylate.

4. A coil having turns thereof embedded in a matrix of a resinous composition containing a mixture of monomeric and polymeric esters of methacrylic acid.

5. The process of treating an electrical coil which comprises the step of applying to the said coil a composition of syrupy consistency containing a monomeric and a polymeric ester of methacrylic acid and subsequently effecting polymerization.

JOHN B. MILES, Jr.

CERTIFICATE OF CORRECTION.

Patent No. 2,116,318.                               May 3, 1938.

JOHN B. MILES, JR.

It is hereby certified that error appears in the printed specification of the above numbered patent requiring correction as follows: Page 1, second column, line 26, after the word and period "hours." insert the following sentence:

Other esters of methacrylic acid may be made in the same general way as methyl methacrylate.;

and that the said Letters Patent should be read with this correction therein that the same may conform to the record of the case in the Patent Office.

Signed and sealed this 19th day of July, A. D. 1938.

Henry Van Arsdale,
Acting Commissioner of Patents.

(Seal)

device which comprises winding a plurality of turns of insulated wire into a coil and applying thereto a mixture of monomeric and polymeric methyl methacrylates so that the interstices of the windings are filled with the said methyl methacrylate, and heating to 60° C. until the mixture solidifies.

3. An insulating varnish comprising a syrupy mixture of monomeric and polymeric methyl methacrylate.

4. A coil having turns thereof embedded in a matrix of a resinous composition containing a mixture of monomeric and polymeric esters of methacrylic acid.

5. The process of treating an electrical coil which comprises the step of applying to the said coil a composition of syrupy consistency containing a monomeric and a polymeric ester of methacrylic acid and subsequently effecting polymerization.

JOHN B. MILES, JR.

CERTIFICATE OF CORRECTION.

Patent No. 2,116,318.    May 3, 1938.

JOHN B. MILES, JR,

It is hereby certified that error appears in the printed specification of the above numbered patent requiring correction as follows: Page 1, second column, line 26, after the word and period "hours." insert the following sentence:

Other esters of methacrylic acid may be made in the same general way as methyl methacrylate.;

and that the said Letters Patent should be read with this correction therein that the same may conform to the record of the case in the Patent Office.

Signed and sealed this 19th day of July, A. D. 1938.

Henry Van Arsdale,
Acting Commissioner of Patents.

(Seal)

CERTIFICATE OF CORRECTION.

Patent No. 2,116,318. May 3, 1938.

JOHN B. MILES, JR.

It is hereby certified that error appears in the printed specification of the above numbered patent requiring correction as follows: Page 1, second column, line 26, after the word and period "hours." insert the following sentence:

> Other esters of methacrylic acid may be made in the same general way as methyl methacrylate.;

and that the said Letters Patent should be read with this correction therein that the same may conform to the record of the case in the Patent Office.

Signed and sealed this 19th day of July, A. D. 1938.

Henry Van Arsdale,
Acting Commissioner of Patents.

(Seal)